Nov. 13, 1928.

T. W. HICKS 1,691,352

TILLER

Filed March 29, 1923

Inventor
T. W. Hicks
By R. W. Blair,
Attorney

Nov. 13, 1928.　　　　　　1,691,352

T. W. HICKS

TILLER

Filed March 29, 1923　　　3 Sheets-Sheet 2

Inventor
T. W. Hicks
By　R. A. Blair
　　　Attorney

Nov. 13, 1928.
T. W. HICKS
TILLER
Filed March 29, 1923  3 Sheets-Sheet 3
1,691,352
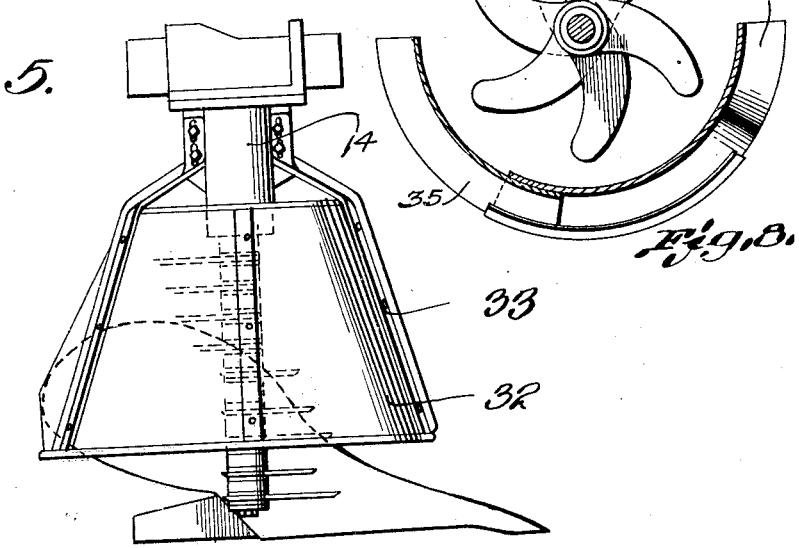
Fig. 5.
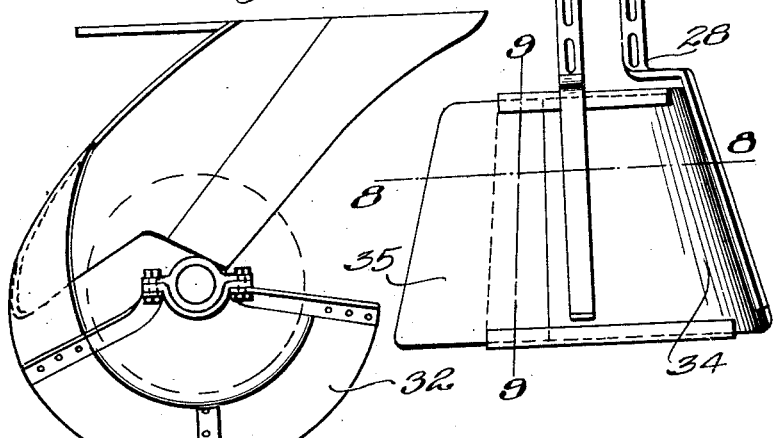
Fig. 6.
Fig. 7.
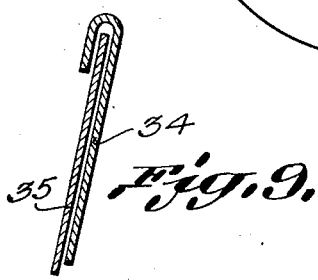
Fig. 9.
Inventor
T. W. Hicks
By R. H. Blair
Attorney Patented Nov. 13, 1928.

1,691,352

UNITED STATES PATENT OFFICE.

THOMAS W. HICKS, OF MINNEAPOLIS, MINNESOTA.

TILLER.

Application filed March 29, 1923. Serial No. 628,649.

This invention relates to improvements in tillers and more particularly to improvements in shields or guards adapted to be associated with a rotating tiller shaft of that general type illustrated and described in my prior Patent No. 1,320,469, dated November 4, 1919.

In that type of apparatus the rotor or disintegrator tiller shaft which operates upon the furrow as it is turned over by the plow, is driven at a relatively high rate of speed, that is, four or five hundred revolutions per minute, and tends to cause the disintegrated soil to scatter over an undesirably large area, and it is for this purpose, among others, that a shield is placed about the disintegrator in order to confine the pulverized soil as it falls to the desired locality, with respect to the furrow slice being turned. Furthermore, the shield acts as a guard to prevent any person or thing coming in contact with the rapidly revolving blades of the disintegrator while in operation.

It is, therefore, one of the objects of the present invention to provide a simple and compact shield which may be associated with the rotor or, if a gang plow is being used, with the rotors, which may be inexpensively manufactured and assembled.

A further object is to provide a strong and durable shield of the above character which may be inexpensively and quickly mounted upon or taken from operative relation with the disintegrator, when it is desired to adjust or replace the blades thereof.

A further object is to provide a shield of the above general character so mounted with respect to the disintegrator as to move therewith and maintain its operative relation thereto when the disintegrator moves or is moved or adjusted relatively to the plow as when an obstruction is encountered and the disintegrator moves laterally to permit the obstruction to pass between its blades and the mold-board.

A further object is to provide a shield of the above general character, provided with certain adjustable features, both as to the extent of covering the area tilled and its relative height with respect thereto.

Other objects will be in part obvious and in part pointed out from the annexed drawings and the following analysis of the invention.

The invention accordingly consists in the features of construction, the combination of parts, and in the unique relation of the various members and the relative proportioning and dispositioning thereof, all as more clearly outlined herein.

To enable others skilled in the art to fully comprehend the underlying features thereof in order that they may embody the same, by numerous modifications in structure and relation contemplated by this invention, drawings depicting several preferred forms of the invention have been annexed as part of this disclosure and in such drawings like characters of reference indicate corresponding parts throughout all the views, of which—

Figure 5 is an elevational view similar to Figure 1, illustrating a further modification;

Figure 6 is a plan view of such modification;

Figure 7 is a view in elevation, showing a further modification;

Figure 8 is a partial sectional plan view thereof; and

Figure 9 is a view taken substantially on the line 9—9 of Figure 7.

Figure 1:
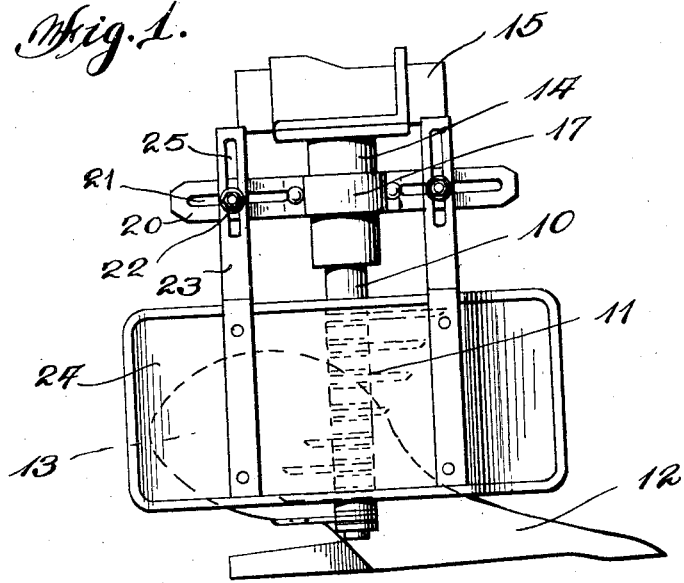
Figure 1 is a side elevational view of one form of shield showing its general relation with respect to a single rotor and plow.

Referring now to the drawings in detail and more particularly to Figure 1, 10 indicates a disintegrator shaft provided with the soil-engaging blades 11 which operate upon the furrow as it is turned by a plow 12 and the usual mold-board 13. This shaft 10 is supported in a suitable housing 14 provided with trunnions 15 whereby the same may yield or swing relatively outwardly with respect to the plow and mold-board as when an obstruction is encountered, such as a large rock that has to pass between the plow and the disintegrator.

Figure 2:
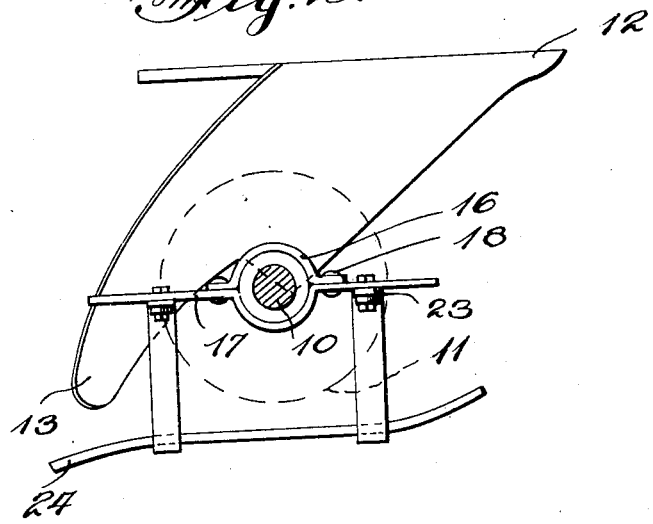
Figure 2 is a partial sectional plan view thereof.

Upon the lower part or sleeve portion of the housing 14 there is provided a fastening support, such as a two-part bracket, the parts 16 and 17 being suitably secured together, as by means of bolts 18. The part 17 is of general U-shaped construction and the ends 20 are provided with slots 21 through which bolts 22 pass to hold two vertically disposed arms 23 in any desired horizontally adjustable position. These arms 23 carry a relatively narrow shield 24 which, if desired, may be slightly curved as indicated in Figure 2 to conform more nearly to the curvature of the plow upon the furrow. The vertical arms 23 are slotted also as at 25, thereby to permit vertical adjustment as well as horizontal adjustment of the shield with respect to the plow and the disintegrator. This is desirable for with different types of standard plows the shape differs materially, that is, some are long and narrow, while others are short and relatively broad and deep. It will thus be seen that this modification permits an adjustment in three planes, that is, vertically, horizontally and radially, for by loosening the nuts 18 the entire shield may be turned about the sleeve 14 to bring certain parts of it either nearer or further away from the point of the plow, for example.

Figure 3:
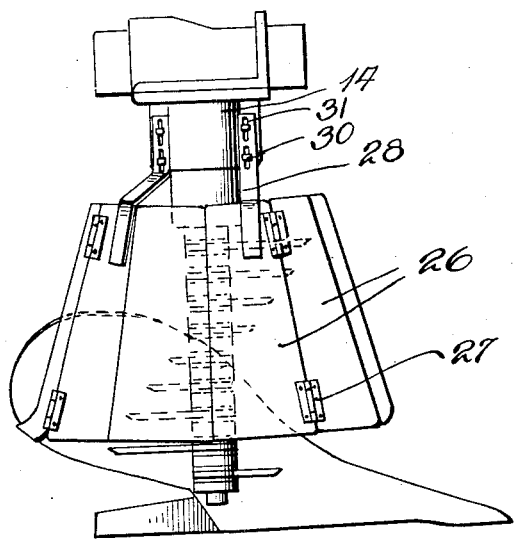
Figure 3 is a modification of a sectional shield in operative relation with respect to one disintegrator.
Figure 4:
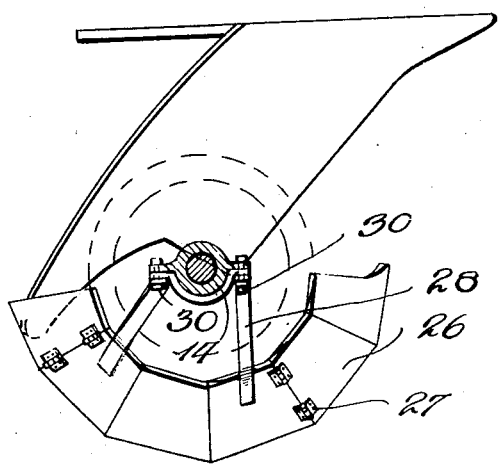
Figure 4 is a plan view partly in section.

In Figure 3, there is shown a slightly different form of shield in which the parts are made up of a plurality of sections 26, hinged together as at 27 and supported by suitable brackets 28 from the housing or sleeve 14. The supporting bolts 30 may co-act with slots 31, thereby to obtain the desired vertical adjustment. The fastening means 30 will also permit an adjustment of the shield about the axis of the tiller shaft.

The modification shown in Figure 5 is very similar to that just described except that the shield is preferably made of a plurality of sections 32 more or less permanently secured together along their adjacent edges 33; the adjustable mounting of the shield upon the housing 14 being also similar to that above described.

In Figure 7 there is shown a still further modification in which a plurality of sections 34 and 35 are utilized, one section telescoping within the other, that is, the part 35 is so constructed and arranged as to telescope within the part 34, as appears more clearly from the plan view, Fig. 8, and the detail partial sectional view, Fig. 9. The mounting of the shield by means of the brackets 28 is substantially the same as that above described in connection with Fig. 3. As shown, the telescoping parts are curved sharply, but obviously, this curvature may be varied up to a straight line if desired. This construction facilitates quick access to the rotor when desired without necessitating the loosening of any nuts or other securing means, and will also, to a certain extent, depending on the relative telescoping of the parts, control the distance to which the disintegrated or pulverized earth is thrown by the rotor, when operating upon the furrow turned by the plow and mold-board.

It will be noted from the above that all of these constructions are of simple and practical design permitting ready adjustment in various planes, as desired, according to the nature or consistency of the soil being operated upon and they also permit ready access to the rotor when necessary. Being preferably mounted directly upon the housing carrying the rotor, the shields will swing or move therewith when movement or adjustment thereof, with respect to the plow, takes place, and at all times shield the rotor against contact by an exterior person or thing and at the same time control the distance to which the pulverized earth is discharged. The invention contemplates a strong and durable mechanism well adapted to accomplish among others all of the objects and advantages herein set forth.

Without further analysis the foregoing will so fully reveal the gist of this invention that others can, by applying current knowledge, readily adapt it for various applications without omitting certain features that from the standpoint of the prior art fairly constitute essential characteristics of generic or specific aspects of this invention and, therefore, such adaptations should and are intended to be comprehended within the meaning and range of equivalency of the following claims.

What I claim is:

1. In a plow having a rotatable tiller mounted thereon to disintegrate earth in the act of being turned by the plow, a shield adjustably mounted with respect to the tiller, and means providing for an adjustment of said shield both vertically and horizontally.

2. In a plow having a rotatable tiller mounted thereon to disintegrate earth in the act of being turned by the plow, a shield adjustably mounted with respect to said tiller, and means providing for the adjustment of said shield, said means comprising a clamping bracket member and slotted brackets associated with the shield and cooperating with the clamping bracket member.

3. In a plow having a rotatable tiller mounted thereon to disintegrate earth in the act of being turned by the plow, and a shield adjustably supported with relation to said tiller, said shield including a plurality of plates arranged in a substantially conical relation with respect to the outer portion of the path of travel of the tiller.

In testimony whereof I affix my signature.

THOMAS W. HICKS.